United States Patent [19]
Schneider

[11] Patent Number: 5,926,152
[45] Date of Patent: Jul. 20, 1999

[54] PARABOLIC ANTENNA FOR MEASURING THE LEVEL IN CONTAINERS

[75] Inventor: Hans-Josef Schneider, Leverkusen, Germany

[73] Assignee: Endress + Hauser GmbH + Co., Maulburg, Germany

[21] Appl. No.: 08/846,535

[22] Filed: Apr. 29, 1997

[30]  Foreign Application Priority Data

May 20, 1996 [DE] Germany .......................... 196 20 272
Jan. 30, 1997 [DE] Germany .......................... 197 03 346

[51] Int. Cl.⁶ .................................................. H01Q 15/20
[52] U.S. Cl. ............................................ 343/915; 343/881
[58] Field of Search ...................... 343/915, 881, 343/7.3

[56] References Cited

U.S. PATENT DOCUMENTS

| | | | |
|---|---|---|---|
| 3,780,375 | 12/1973 | Cummings et al. | 343/915 |
| 3,827,049 | 7/1974 | Van Staaden et al. | 343/7.3 |
| 4,030,102 | 6/1977 | Kaplan et al. | 343/915 |
| 4,683,475 | 7/1987 | Luly | 343/915 |
| 4,780,726 | 10/1988 | Archer et al. | 343/881 |
| 5,451,975 | 9/1995 | Miller et al. | 343/915 |
| 5,554,998 | 9/1996 | Sherwood et al. | 343/881 |

FOREIGN PATENT DOCUMENTS 195 00 324  5/1996  Germany .

Primary Examiner—Frank G. Font
Assistant Examiner—Tu T. Nguyen
Attorney, Agent, or Firm—Bose McKinney & Evans

[57] ABSTRACT

A parabolic antenna for measuring the level in containers is proposed, a transmitted pulse from a transmitting and receiving device being focused via the parabolic antenna and directed onto the surface of a filled material whose level is to be determined, and the pulse reflected at the surface of the filled material being received again by the receiving device via the parabolic antenna. For the purpose of introducing the measuring instrument through an opening in the container, the parabolic antenna can be folded and unfolded by being positively moved.

21 Claims, 4 Drawing Sheets

PARABOLIC ANTENNA FOR MEASURING THE LEVEL IN CONTAINERS

FIELD OF THE INVENTION

The invention relates to a parabolic antenna for focusing transmitted pulses during measurement of the level in closed containers, having a combined transmitting and receiving device by means of which transmitted pulses are directed via the parabolic antenna onto the surface of the filled material whose level is to be measured, and the echo pulses of which surface are received again by the combined transmitting and receiving device via the parabolic antenna after reflection at the surface of the filled material, it being the case that the antenna can be folded for the purpose of guiding the measuring instrument through an opening in the container and the distance between the transmitting and receiving device and the surface of the filled material is determined from the propagation time of the pulses from the transmitting device to the surface of the filled material and back to the receiving device, and the level in the container is calculated therefrom and the level signal is output in analog and/or digital fashion for further processing. The further processing can be performed in a processing component such as a recorder, indicator or a field component of a process control system or a programmable controller.

DESCRIPTION OF THE PRIOR ART

Ultrasonic sensors and, to an increased extent, microwave sensors have been proving themselves as transmitting and receiving devices. Without ruling out the application of the invention for ultrasonic sensors, it is to be assumed that the level-measuring instrument is a microwave level-measuring instrument. However, such instruments are used to measure level not only in containers or tanks, but also in processing apparatuses such as, for example, reactors, centrifuges, mixers, hoppers, graders, or heat-treatment furnaces and similar devices which are used in food chemistry, pharmaceutical chemistry, biochemistry, gene chemistry and petrochemistry. In addition to the pulse method described (propagation time measuring method), use is also made of instruments employing the FMCW (Frequency Modulated Continuous Wave) method. Such microwave level-measuring instruments are equipped with a bar antenna or a horn antenna.

It occurs very frequently in process measuring engineering or process control engineering that the level of a medium is to be measured under difficult and/or constricted spacial conditions. Specifically, when the surface of the medium to be measured swallows the bulk of the transmitted energy, that is to say, the surface of the filled material is wavy, the filled material has low dielectric constants of around 1.2 to 2.0, or the measuring site is located in the vicinity of the container wall or of agitators, inputs or other disturbing built-in components. In addition, the more accurately the measurement is to be performed, and the more difficult the conditions at the measuring site, the more value must be placed on a suitable antenna system.

Porceeding from the known equation $$\frac{P_R}{P_T} \approx \frac{D^4 \times \delta^2}{H \times \lambda^2}$$

which: in $P_R$ is the received power; $P_T$ is the outgoing power; D is the diameter of the parabolic antenna; H is the container height, measuring distance; δ is the reflection coefficient as a function of filled material, type of the surface of the filled material, etc.; λ is the wavelength, in such a case it is known to the person skilled in the art and customary for him to focus the transmitted pulse via a parabolic antenna and to direct an amplified, focused pulse onto the surface of the filled material. Although the use of such a parabolic antenna signifies a high measuring accuracy which also satisfies dealings with the Bureau of Standards, the disadvantage of the parabolic antennas used so far resides in the fact that the diameter of bar or horn antennas is usually 80–200 mm, while the diameter of previously known parabolic antennas is 200–800 mm, indeed even 1200 mm in size. This means that when such measuring instruments are built into existing closed containers or other processing apparatuses it is necessary for installation openings having diameters of just this size to be provided and resealed removably by covers or flanges. However, it also frequently happens that the ideal measuring site, approximately 0.15×0.3×radius of the container wall is situated at a point where no such large openings can be provided in the container wall or the cover of a container. Consequently, although a suitable measuring instrument which focuses the transmitted pulse is available, because of the size of the opening required for this purpose it can be provided in the container wall only at considerable outlay.

In order to eliminate this disadvantage, German Patent 195 00 324 proposes an antenna reflector which comprises a plurality of pivotable reflector segments, and each segment is mounted on a mounting cylinder, which can be inserted into the container through an opening, via a single-axle pivot joint, and the segments can be pivoted via an actuator into a position which is angled off with respect to the cylinder axis.

It is disadvantageous in this antenna reflector that, initiated via an actuator, only a pivoting of the reflector segments into a position which is angled off with respect to the cylinder axis, that is to say an opening, is performed, while in the device in accordance with this patent there is no provision for a positive pivoting of the segments into a position along the axis of the mounting cylinder, that is to say for a closure which alone renders it possible to retract the antenna from the container again.

However, the rugged environmental conditions at the measuring site inside the container very quickly cause such a strong contamination of the antenna reflector that when it is required to dismount the antenna and bring it out of the container again, closure is impossible or at least substantially impeded, with the result that an attempt at positive closure of the reflector can even entail damaging it.

U.S. Pat. No. 4,683,475 likewise discloses a foldable antenna reflector which instead of stable individual elements comprises a foldable flexible metal-coated foil. An axially displaceable main slide is connected to the reflector rods. The axial displacement causes the antenna reflector to open and fold together. Although the antenna reflector shown here is likewise suitable for receiving and reflecting microwaves, the task, and thus the configuration of the antenna relate to transmitting radio-frequency signals. It is completely unsuitable for the present case of use in process engineering.

OBJECTS AND SUMMARY OF THE INVENTION

By contrast, it is the object of the invention to propose a foldable parabolic antenna which, inserted folded together into an opening of smaller diameter in a container, can be opened up positively in the interior of the container and, in case of need, can be folded again, likewise positively, and retracted.

This object is achieved by means of the features characterized in the patent claims. The embodiments of the invention are characterized in the subclaims.

BRIEF DESCRIPTION OF THE DRAWINGS

The invention is to be described in more detail with the aid of the drawings, in which.

DETAILED DESCRIPTION OF THE INVENTION

Figure 1:
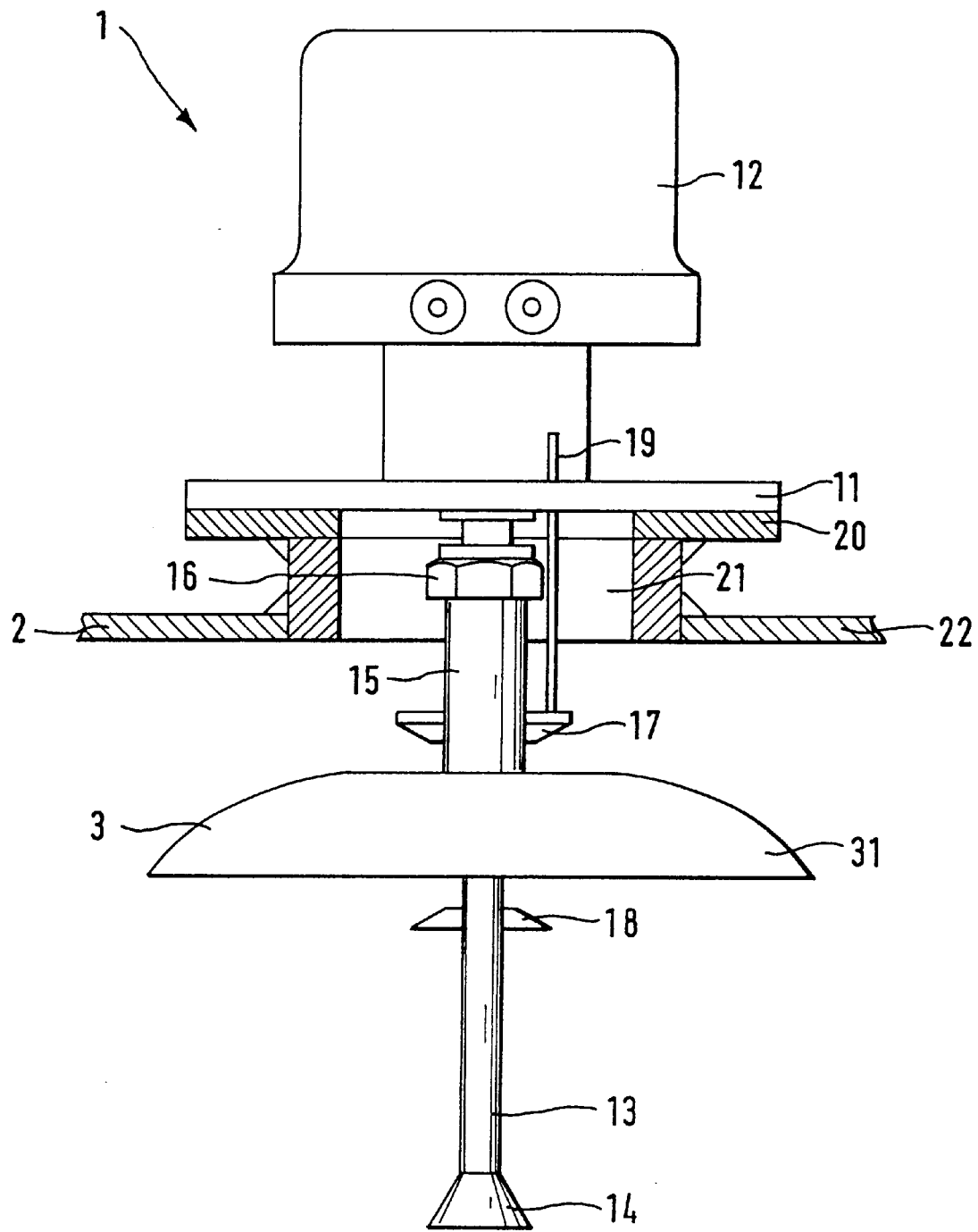
FIG. 1 shows the representation of a microwave level-measuring instrument, in which the parabolic antenna is applied.

Represented in FIG. 1 by 1 is a level-measuring instrument, which is, for example, to be a microwave level-measuring instrument. The level-measuring instrument is used to determine the level of a medium to be measured, which is located in the interior of a container, and to output the measured value in an analog and/or digital fashion for further processing. For this purpose, the level-measuring instrument 1 is screwed by means of an instrument flange 11 to a container flange 20 which surrounds the opening 21 of a container 2. The container 2 is indicated by a short piece of the container wall or of the container cover 22. The level-measuring instrument has a housing 12 in whose interior there are located the electrical/electronic components by means of which the level-measuring instrument is operated and the measuring signal is generated and transmitted. Extending in the direction of the container interior from the instrument flange 11 is the antenna tube 13, on whose end averted from the flange the combined microwave transmitter and receiver 14 is arranged. Between the instrument flange 11 and the microwave transmitter and receiver 14, a parabolic antenna 3 is connected to the antenna tube 13 in such a way that the parabolic reflector 31 runs symmetrically around the axis of symmetry of the antenna tube 13. In this arrangement, the distance between the transmitting and receiving device 14 and the parabolic antenna 3 is selected such that the transmitter and receiver 14 is located precisely at the focal point of the parabolic antenna 3. The transmitting part of the transmitting and receiving device 14 radiates a microwave in the direction of the inner wall of the parabolic reflector 31. This microwave is reflected by the tangent characteristic of the paraboloid such that it is directly parallel to the longitudinal axis of the antenna tube 14 onto the filled material located in the interior of the container, and after reflection on the surface of the filled material, which surface acts as a reflection plane, reaches the parabolic reflector 31 of the parabolic antenna 3 again as an echo wave, is reflected there again and, thus focused, is then directed onto the receiver 14 located at the focal point.

In order to arrange the parabolic antenna 3 in the interior of the container 2, the opening 21 must correspond to the outside diameter of the antenna 3. However, such a large opening is very frequently not present at all, or can be provided in the container wall or the container cover only with a high outlay, or large flange openings which are present have already been otherwise assigned. Furthermore, providing such a large opening, which has to be sealed again in a pressure tight fashion, signifies substantial outlay on work and costs. Also, the measuring instrument must then have an instrument flange which is so large that its diameter corresponds to the diameter of the container opening and thus of the parabolic antenna. In order to remedy this disadvantage, it has already been proposed to configure the parabolic antenna 3 to be capable of folding together so that the antenna can be inserted in the closed state through a substantially smaller opening in the container wall or the container cover, and can be opened in the interior of the container. In a further development of this state of the art, the pivoting of the antenna elements is to be performed by means of the adjusting device 15. The hexagon 16 indicates this possibility of adjustment by the action of the torque of a spanner which has been slipped on. When applied in process engineering, such antennas are exposed to an enormous amount of environmental pollution. Changing temperatures, dry and moist dusts, baked-on filled materials, etc. limit the mobility of the adjusting segments after only a short time. Moreover, it is important for the purpose of achieving the ability to function for the parabolic antenna to be opened and closed completely, for which reason the invention proposes to execute both the opening and the closing of the antenna by positive movement from the opening 21. Moreover, a cleaning device 17, 18 is arranged on the antenna tube 14 in order to be able to clean the antenna from outside in the case of impairment of function by extreme contamination, for example extreme instances of baking on. In this case, nozzles are used to direct a jet of compressed air or a cleaning liquid onto the antenna and thereby free the latter from the extreme contamination impairing function, or extreme instances of baking on in the case of filled materials such as tar, bitumen and the like. A feed line 19 penetrates the flange 11 and can thus be connected from outside the container.

Figure 2:
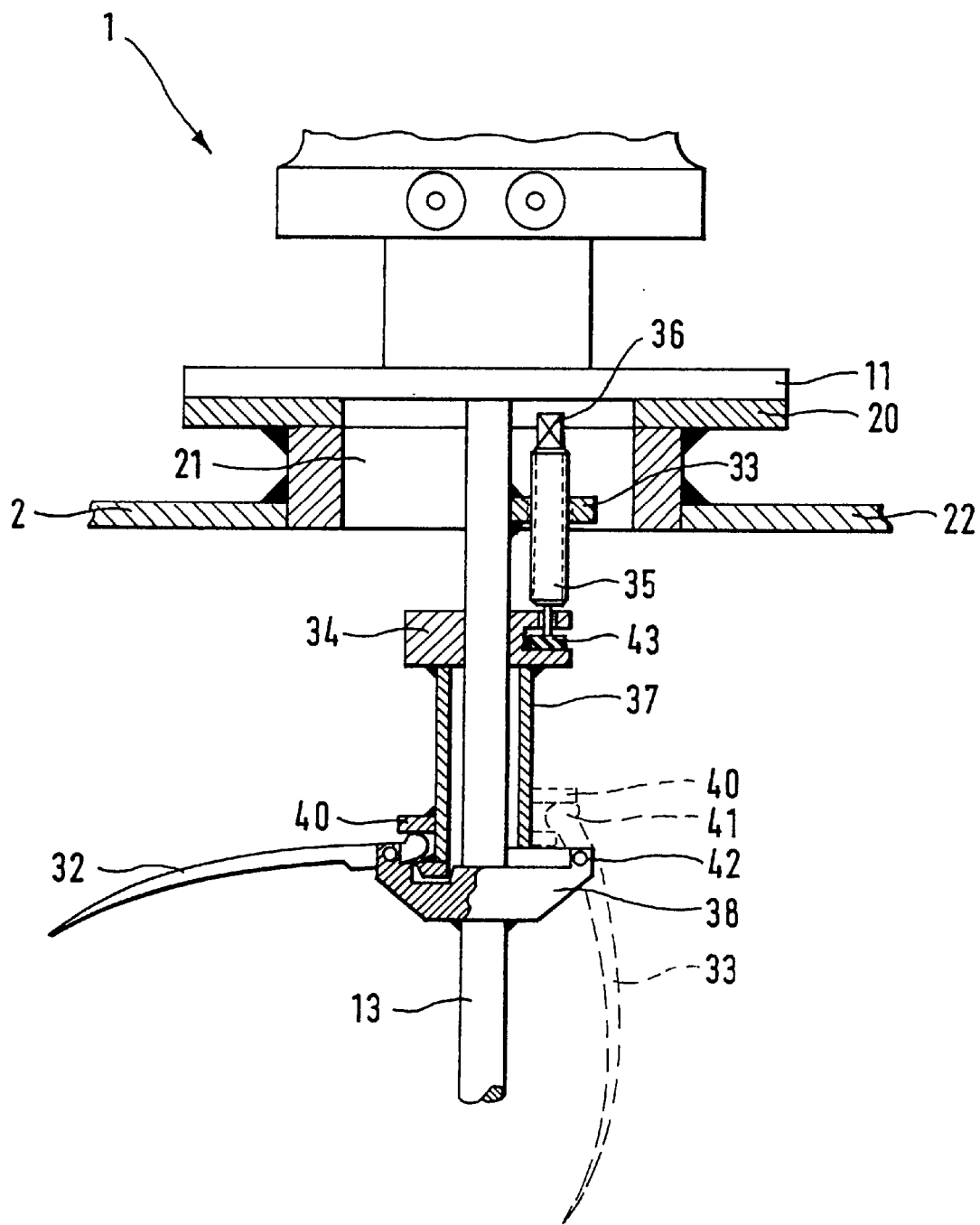
FIG. 2 shows a section of the microwave level-measuring instrument shown in FIG. 1, with a first exemplary embodiment of the foldable antenna.

FIG. 2 shows a first exemplary embodiment of the invention. Here, the same position numbers are used again to show a part of the level-measuring instrument 1, the container 2, the flanges 11 and 20, the opening 21, the container wall 22 and the antenna tube 13. The parabolic antenna 3 is represented only by two reflector rods 32, 33. All further parts have been omitted for the purpose of better clarity. In FIG. 2, the left-hand reflector rod 32 assumes a position which is pivoted out, that is to say as with the antenna open, and the right-hand reflector rod 33 (represented by dashes) a position with the antenna closed. The two reflector rods 32, 33 are respectively mounted in a pivot bearing 42. In a position as shown on the right, the antenna is inserted into the container 2 through the opening 21, and unfolded by means of the actuating gear 34 before the flange 11 is mounted. For this purpose, the spindle 35 is turned about its axis by the torque of a spanner, applied to the fitting part 36, in such a way that the slide 37 is moved in the direction of the bearing ring 38. The spindle 35 is translated via the spindle nut 39 mounted on the antenna tube 13. Receptacles 40 are integrally formed on the slide 37 on the side facing the transmitting and receiving device 14. The spherical ends 41 of the short limb of the reflector rods 32, 33 engage in the receptacles 40. The parallel plates of the receptacles 40 are joined in a self-closed fashion to the spherical ends 41. The movement of the slide 37 causes a torque to be exerted on the spherical ends 41 of the reflector rods 32, 33, with the result that the latter are pivoted about the fulcrum of the pivot bearings 42 and, when the slide 37 strikes against the bearing ring 38, assume a precisely defined position which corresponds to the functional position of the antenna 3. In this position, the level-measuring instrument can now be correctly mounted on the flange 20, and the flanges 11 and 20 can be screwed to one another.

In the opposite sense, the spindle 35 exerts a tensile force on the slide 37 via the abutment 43. This tensile force moves the slide in the direction of the opening 21 and pivots the spherical limbs of the reflector rods 32, 33 in a self-closed fashion in such a way that the reflector rods assume a position as represented in the right-hand side and in which the antenna 3 can easily be guided from the container 2 through the opening 21. It is now easy to see that the parabolic antenna 3 can assume any position, from completely closed to completely open, with the aid of the actuating gear 34, even given substantial contamination.

Figure 3:
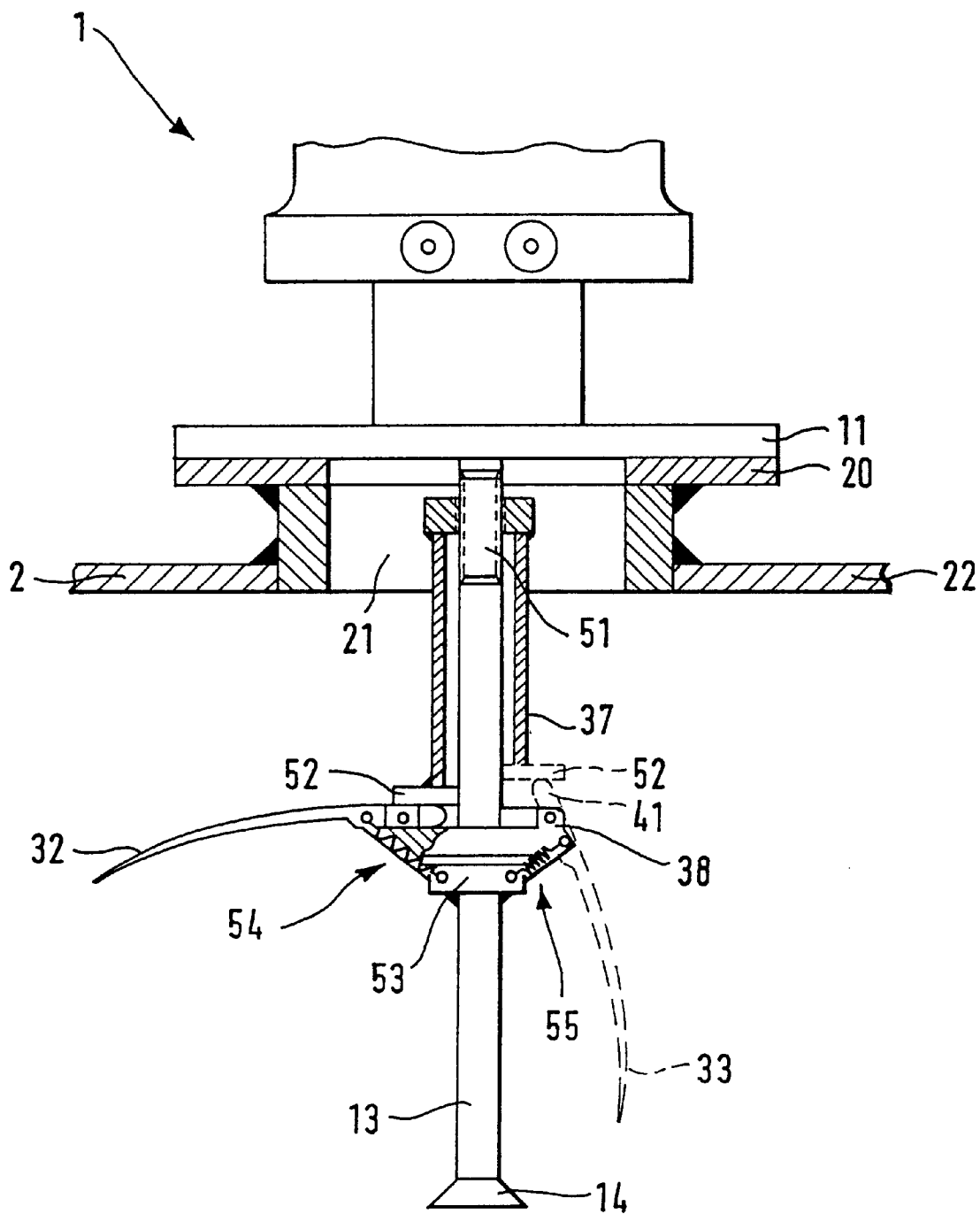
FIG. 3 shows a second exemplary embodiment of the foldable antenna.

The exemplary embodiment shown in FIG. 3 differs from that shown in FIG. 2 only in that instead of the spindle 35 the antenna tube 14 itself is provided with a movement thread 51. Instead of the receptacles 40, this embodiment exhibits a pressure plate 52 joined in a self-closed fashion to the spherical limbs of the reflector rods 32, 33. Furthermore, the antenna tube 13 has a spring holder 53 surrounding the tube. Tension springs 54, 55 are arranged between the spring holder 53 and the reflector rods 32, 33. In this embodiment, the effect of the spring elements 54, 55 is that the antenna 3 is in a folded-up position when inserted into the container 2 through the opening 21. In contrast to the embodiment in accordance with FIG. 2, the antenna is pivoted open by rotating the slide 37 about its axis and moving it along the thread 51 in the direction of the bearing ring 38. Owing to this movement, the pressure plate 52 exerts a torque on the spherical limbs of the reflector rods 32, 33, with the result that the latter are pivoted against the action of the tension springs 54, 55 and opened.

A rotary movement of the slide 37 in the other direction will lead to a movement of the slide 37 in the direction of the opening 21, with the result that the reflector rods 32, 33 are pivoted back under the action of the spring force of the tension springs 54, 55. If the movement of the slide 37 is large enough, the two reflector rods 32, 33 will assume a position in which the antenna is closed and can easily be retracted from the container 2. In this embodiment, as well, the parabolic antenna 3 can be opened into any desired position from the opening 21, and can be closed again by the action of the tension springs even given contamination.

Figure 4:
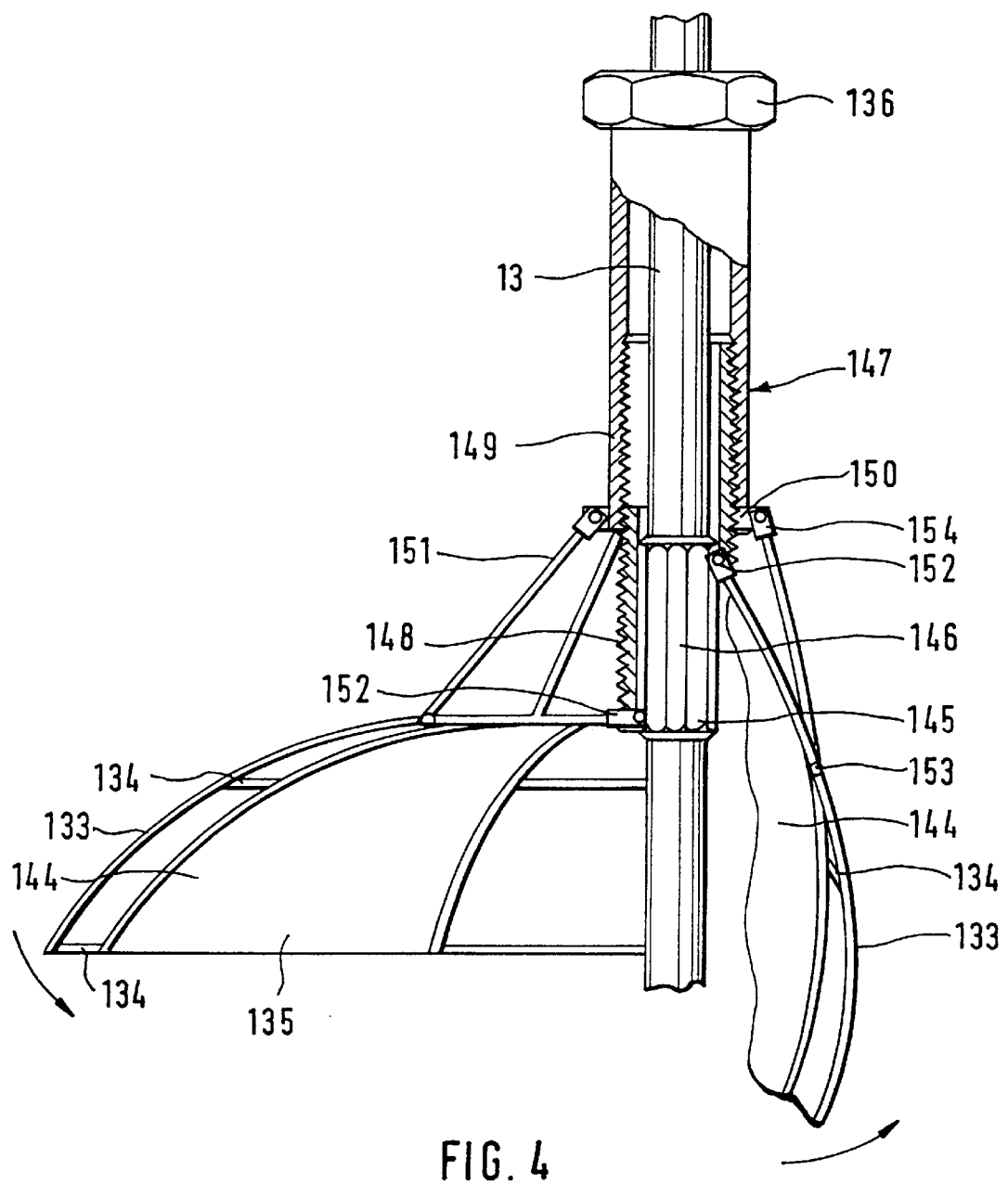
FIG. 4 shows a further exemplary embodiment of the foldable antenna.

FIG. 4 represents the development of the exemplary embodiments shown in FIGS. 2 and 3. Here, as well, a fairly small section of the microwave level-measuring instrument 1 is represented. The representation is limited to the parabolic antenna 3 and the actuator. In FIG. 4, as well, the open position of the parabolic antenna is shown on the left-hand side, and the closed position is shown on the right-hand side.

The parabolic antenna 3 comprises a number of reflector rods 133, of which only 5 are represented in the exemplary embodiment. For insertion into the container 2 through the opening 21, the antenna will assume a shape as is shown on the right-hand side. In order to reflect the microwaves, the reflector rods 133 are spanned by a flexible, heat-resistant, pressure-proof, foldable anti-corrosion metal foil 144 which is neutral as regards static charges. This foil can be produced, for example, from steel, stainless steel, aluminum or a nickel-chromium-manganese alloy. However, a metallized plastic film of requisite stiffness can also be used. In order to lend the foil antenna the requisite stiffness for functioning, transverse struts 134 extend between the reflector rods 133. However, these transverse struts do not run around the entire parabolic reflector, but leave free between neighboring reflector rods symmetrical sections 135 through which the foil can fold in when the antenna is being closed. A bush 145 is integrally formed or permanently joined to the antenna tube 14 in order to open and close the antenna. The bush 145 has grooves 146 extending in the axial direction along its circumference. These grooves are provided symmetrically at an equal spacing on the lateral surface of the bush 145. The grooves 146 are generally produced using a metal-cutting method. The actuator has a worm gear 147 for the purpose of opening and closing the reflector. The worm gear 147 is formed from an element pair, specifically the screw slide 148 and the clamping nut 149. A holder 150 runs round in a groove at the end of the lateral surface of the clamping nut 149 which faces the bush 145. Bearing elements with which the expanding struts 151 engage are integrally formed on the circumference of the holding ring 150. The connection between the holding ring 150 and the clamping nut 149 is accomplished by fitting an easy sliding fit, with the result that the bearing elements of the holding ring 150 maintain their position on the circumference of the clamping nut 149 even when the clamping nut 149 is rotated about its own axis.

Further bearing elements 152 form a self-closed functional unit together with the screw slide 148 and have guide rollers via which the bearing elements 152 are movably mounted in the grooves 146 of the bush 145. The bearing elements 152 form the end of the reflector rods 133 which faces the antenna tube 13. They form the mounting point and fulcrum and thus the crown of the parabolic antenna 3.

The worm gear 147 is set in motion by the rotary movement, executed by means of the action of a torque on the spanner faces 136, of the clamping nut 149 about its own axis; the effect is that the screw slide 148 is moved in the direction of the microwave sensor and receiver 14. As the same time, the bearing element 152 is thereby moved in the same direction, and the reflector rods 133 are retained in their position by the bearing 153, forming an attachment clip, of the expanding struts 151, with the result that the reflector rods 133 execute a pivoting movement about the fulcrum 153, and the parabolic antenna opens. This movement is continued until the bearing elements 152 have reached a position at the end of the grooves 146. After termination of this process, the parabolic antenna assumes a position as represented on the left-hand side in FIG. 4. Conversely, if the bearing elements 152 are moved by the opposite rotation of the clamping nut 149 in the direction of the opening 21 until the rollers have reached the upper end point of the grooves 146, the reflector rods 133 will again assume their original position.

The metal parts of the parabolic antenna are either constructed from a material resistant to the media to be measured, such as high-alloy steels, for example, or else are coated with a plastic resistant to these media. However, they can also be produced from a suitable plastic.

The design of the thread of the screw gear 147 as a fine thread, for example a metric fine thread, for example in accordance with DIN 13, greatly expands the possibility of determining the position of the reflector rods. As a result, the shape of the parabolic reflector can be set reproducibly precisely and exactly in accordance with the greatest efficiency of reflection of the microwave lobe as a function of the nature of the reflection plane.

In the case of the requisite folding up of the parabolic antenna and retraction of the microwave measuring instrument, the application of a worm gear yields the advantage, owing to the transmission ratio of the latter, that the antenna can be closed again through positive movement despite substantial contamination, without damage occurring to the reflector rod struts and the foil.

Of course, the invention is not limit embodiment of the paraboment of the parabolic antenna formed from a flexible foil. The positive closure and opening by means of the device according to the invention is also possible in the case of an antenna reflector assembled from stable individual elements or segments.

I claim:

1. A parabolic antenna for focusing transmitted and reflected pulses during measurement of a level of a material in a closed container, the closed container having an instrument opening, antenna comprising a parabolic reflector moveable between a closed position and an open position, and an adjusting device coupled to the parabolic reflector, wherein the adjusting device folds the parabolic reflector by positive movement to the closed position for insertion through the instrument opening, and the adjusting device can be operated through the instrument opening to unfold the parabolic reflector by positive movement to the open position and to fold the parabolic reflector by positive movement to the closed position while the parabolic antenna is inside the container.

2. The parabolic antenna as claimed in claim 1, wherein the adjusting device holds reflector rods which determine the shape of the parabolic reflector, in any desired position from open to closed.

3. The parabolic antenna as claimed in claim 1, wherein the adjusting device is formed by an axially moveable actuating gear (34).

4. The parabolic antenna as claimed in claim 1, wherein the adjusting device is formed by the co-operation of an axially moveable rotary slide (37) and spring elements (54, 55).

5. The parabolic antenna as claimed in claim 1, wherein the adjusting device is formed by a worm gear (147).

6. The parabolic antenna as claimed in claim 3, wherein the axial movement of the actuating gear (34) effects the pivoting of reflector rods (32, 33) about a fulcrum (42).

7. The parabolic antenna as claimed in claim 4, wherein the pivoting of reflector rods (32, 33) about a fulcrum (41) is performed against and/or with the action of spring elements (54, 55).

8. The parabolic antenna as claimed in claim 5, wherein the worm gear (147) is formed from the element pair of a screw slide (148) and clamping nut (149).

9. The parabolic antenna as claimed in claim 5, wherein the ends, forming the crown of the parabolic antenna, of reflector rods (133) are designed as bearing elements (152) which can move axially in grooves (146) and which are the point of action of a pivoting movement, effected by the axial movement of the worm gear (147), about a fulcrum coinciding with an attachmnent clip (153) of the reflector rods (133).

10. The parabolic antenna as claimed in claim 5, wherein the parabolic reflector (31) has expanding struts (151) which, on the one hand, are mounted on a holding ring (150) of the clamping nut (149) and, on the other hand, form, in a fashion coinciding with the attachment clip (153) of reflector rods (133), the fulcrums of the pivoting movement of the reflector rods (133).

11. The parabolic antenna as claimed in claim 1, wherein the parabolic reflector (31) is formed from a lattice framework, expanding struts (151) which, on the one hand, are mounted on a holding ring (150) of the clamping nut (149) and, on the other hand, form, in a fashion coinciding with the attachment clip (153) of reflector rods (133), the fulcrums of the pivoting movement of the reflector rods (133).

12. The parabolic antenna as claimed in claim 11, wherein the foil (144) forming the surface of the antenna is formed from a metal foil resistant to the measured medium, or from a metallized plastic film.

13. The parabolic antenna as claimed in claim 11, wherein the reflector rods (133) and transverse struts (134) forming the parabolic reflector (31) are produced from a metal resistant to the measured medium, or are coated with a plastic resistant to the measured medium.

14. The parabolic antenna as claimed in claim 11, wherein sections left free of transverse struts (134) on the circumference of the parabolic reflector (31) and into which a segments of the reflector foil (144) fold are distributed symmetrically between neighboring reflector rods (133).

15. The parabolic antenna as claimed in claim 11, wherein the reflector foil (144) is joined to the reflector rods (133) and transverse struts (134) by bonding, welding, as well as any other method known to the person skilled in the art.

16. The parabolic antenna as claimed in claim 11, wherein the reflector rods (133) and transverse struts (134) forming the parabolic reflector (31) are joined by welding, or any other method known to the person skilled in the art.

17. The parabolic antenna as claimed in claim 1, wherein the drive initiating the folding and unfolding movements is performed by hand or by means of electric or pneumatic auxiliary energy.

18. The parabolic antenna as claimed in claim 5, wherein an element pair (148, 149) forming the worm gear (147) has a motion-transmitting thread.

19. The parabolic antenna as claimed in claim 1, wherein the parabolic reflector is formed from dimensionally stable individual elements or segments.

20. The parabolic antenna as claimed in claim 1, further comprising a cleaning means for cleaning the parabolic antenna.

21. The parabolic antenna as claimed in claim 20, wherein the cleaning means are pneumatic or fluidic cleaning nozzles (17, 18) and are connected to an external supply line (19).

* * * * *